Figure 1:
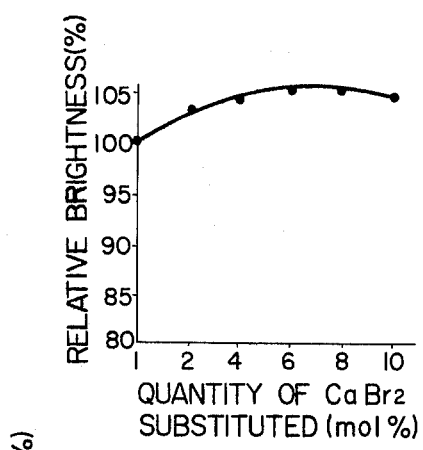

United States Patent Office 3,226,334
Patented Dec. 28, 1965

3,226,334
METHOD OF PRODUCING PHOSPHORS
Jyusaku Machida, Shinjuku-ku, Tokyo-to, Naoki Hagiwara, Ota-ku, Tokyo-to, Tomoo Yamada, Kawasaki-shi, Masao Isago, Toshima-ku, Tokyo-to, and Nobuyuki Sugishita, Kawasaki-shi, Japan, assignors to Hitachi Ranpu Kabushiki Kaisha, Tokyo-to, Japan, a joint-stock company of Japan
Filed Feb. 10, 1964, Ser. No. 343,809
Claims priority, application Japan, Dec. 30, 1960, 35/51,713
5 Claims. (Cl. 252—301.4)

This application is a continuation-in-part of prior application Serial No. 129,647 filed August 7, 1961, now abandoned, in the name of Jyusaku Machida, Naoki Hagiwara, Tomoo Yamada, Masao Isago and Nobuyuki Sugishita, and entitled "Production of Phosphors."

This invention relates to the production of oxy-salt phosphors and more particularly it relates to a new method of producing phosphors having higher luminous efficiency, which comprises synthesis of the phosphors by substituting one portion or the whole part of an oxide and a salt, such as the carbonate or nitrate of alkaline earth metal which becomes oxide after calcination, with bromide and then by evaporating bromine off the bromide as the result of dissolution and decomposition in the process of synthesizing reaction of the phosphors in order to prevent change in the phosphor compositions before and after the synthesis.

In the synthesis of such oxy-salt phosphor as calcium halophosphate, strontium phosphate, calcium tungstate, and calcium silicate, it has been the general practice to add, as an alkaline earth metal constituent, one or a mixture of two or more substances selected from oxides and salts such as carbonates and nitrates, etc. which become oxides after calcination thereof. However, this method has had disadvantages, which include among others the fact that when the calcining temperature is raised the pulverization of the phosphor becomes difficult after calcination, and also the powder brightness, that is, the luminance of the pulverized substance is lowered. Also, bromides have been conventionally used as the halogen-introducing component in the production of halophosphate phosphor. However, when a bromide is used as the halogen-introducing component, considerable disadvantages are experienced due to the fact that the composition of phosphor varies during calcination as a result of the decomposition of the bromide, whereby the luminous efficiency of phosphor is lowered. For instance, the phosphor having the composition of $$6Ca_3(PO_4)_2 \cdot 1CaF_2 \cdot 1CaBr_2$$

or $Ca_{20}P_{12}O_{48}F_2Br_2$ before calcination is subjected to the following decomposition during calcination:

$$6Ca_3(PO_4)_2 \cdot 1CaF_2 \cdot 1CaBr_2 + \tfrac{1}{2}O_2 \rightarrow$$
$$6Ca_3(PO_4)_2 \cdot 1CaF_2 \cdot 1CaO + Br_2\uparrow$$

and the composition of the final phosphor product becomes $Ca_{20}P_{12}O_{49}F_2$, which is a compound having different composition from the apatite composition of $$3M_3(PO_4)_2 \cdot 1MX_2$$

(where: M is alkaline earth metal and X is halogen). Accordingly, the luminous efficiency is lower.

It is therefore an object of the present invention to provide a new method of producing phosphors which, after synthesis, have compositions equivalent to those of a conventional phosphor and yet have substantially higher luminous efficiency.

The said object, other objects and advantages of the present invention have been achieved by the method of the present invention wherein a compound which has the function of promoting the reaction of synthesis is added.

More specifically, the method of the present invention comprises, instead of adding an alkaline earth metal as a salt or oxide, synthesizing the phosphor by substituting a part or the whole of such salt or oxide with a bromide and mixing as well as calcining the same.

Since the melting point of a bromide to be added ranges from 500° C. to 900° C., if it is calcined at a higher temperature, it will be dissolved and decomposed and the bromine will be evaporated and dispersed. On account of this, the bromide will not remain within the phosphor after calcination, and only the alkaline earth metal remains as an oxide. That is, the chemical reaction may be represented by the following equation:

$$CaBr_2 + \tfrac{1}{2}O_2 \rightarrow CaO + Br_2\uparrow$$

Moreover, since the bromide accomplishes the function of promoting the synthetic reaction of the phosphor by being dissolved and decomposed in the calcining process, it is possible to elevate the calcining temperature higher than in the case wherein the bromide is not used. Accordingly, it is possible to raise the powder brightness of the phosphor obtained by 3 to 5 percent.

Next, the present invention will be explained in connection with the halophosphate phosphor. When the phosphor having the apatite composition of $$3Ca_3(PO_4)_2 \cdot 1CaF_2$$

after synthesis is synthesized by a conventional method wherein no bromide is used, the end product is produced as a result of the reaction represented by the following equation:

$$6CaHPO_4 + 3CaCO_3 + CaF_2 \rightarrow$$
$$3Ca_3(PO_4)_2 \cdot 1CaF_2 + 3H_2O\uparrow + 3CO_2\uparrow$$

On the other hand, according to the present invention, $x$ mol of a part of $CaCO_3$ in the equation of $$6CaHPO_0 + 3CaCO_3 + CaF_2$$

is substituted with a bromide and the following reaction is carried out:

$$6CaHPO_4 + (3-x)CaCO_3 + x \cdot CaBr_2 + CaF_2 \rightarrow$$
$$3Ca_3(PO_4)_2 \cdot 1CaF_2 + 3H_2O\uparrow + (3-x)CO_2\uparrow + x \cdot Br_2\uparrow$$

The luminous efficiency of the phosphor thus obtained can be improved by a few percent above that of conventional phosphors. The optimum quantity of activator to be added can be varied in accordance with the quantity of bromide substituted.

Figure 2:
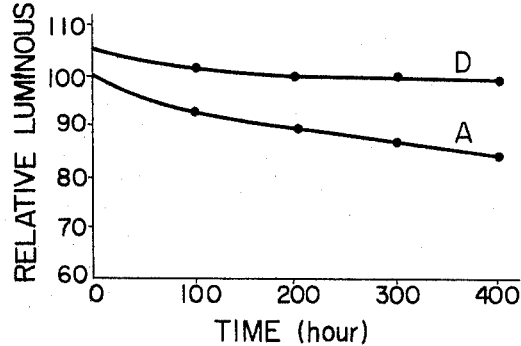

The nature of the invention as well as the details thereof will be more apparent by reference to the following examples of embodiments of the invention, the first of which being further illustrated by the accompanying graphs in which:

FIGURE 1 is a graphical representation indicating the relation between the quantity of calcium bromide substituted in the production process according to this invention and the brightness of the phosphor produced; and FIGURE 2 is a graphical representation indicating a comparison between the variation with time of the relative value of luminous flux of a conventional phosphor and that of a phosphor produced according to the present invention.

EXAMPLE 1

When calcium carbonate to be added as a calcium constituent in a calcium-cadmium halophosphate phosphor is substituted with calcium bromide, and the substance is calcined for two hours in an electric furnace at a temperature of 1150° C., if the adding quantity of activating antimony is kept constant, the powder brightness of the phosphor thus obtained increases in accordance with the quantity of calcium bromide substituted, as shown in the following Table 1, and it becomes maximum with 6 to 8 mol percent of calcium bromide substituted.

In the following Table 1, specimen A represents a conventional product, while specimens B through F represent phosphors produced by the method of the present invention.

*Table 1*

| Specimen | $Sb_2O_3$ (Weight percent relative to base of 100) | $CaBr_2$ (Mol percent substitution quantity relative to $CaCO_3$) | Relative brightness (percent) |
| --- | --- | --- | --- |
| A | 4.9 | 0 | 100 |
| B | 4.9 | 2 | 103 |
| C | 4.9 | 4 | 104 |
| D | 4.9 | 6 | 105 |
| E | 4.9 | 8 | 105 |
| F | 4.9 | 10 | 104 |

The variation of the relative brightness of the pulverized phosphor with the quantity of calcium bromide substituted, based on the results of this Example 1 as shown in the above Table 1, is indicated graphically in FIG. 1.

The variations of relative value of luminous flux with time in the case of a conventional product as indicated by a curve A (corresponding to the specimen A in Table 1), and, in the case of a phosphor produced in accordance with the present invention as indicated by a curve D (corresponding to the specimen D of Table 1) are shown graphically in FIG. 2.

EXAMPLE 2

In a calcium-cadmium halophosphate phosphor, when a part of calcium carbonate is substituted with a certain quantity of calcium bromide, and then the quantity of the activating antimony to be added is varied for different specimens, the relative brightnesses of the phosphors thus obtained are raised as shown in the following Table 2.

*Table 2*

| Specimen | $CaBr_2$ Substitution quantity (Mol percent) | $Sb_2O_3$ (Weight percent) | Relative brightness (percent) |
| --- | --- | --- | --- |
| G | 6.5 | 4.2 | 103 |
| H | 6.5 | 4.9 | 105 |
| I | 6.5 | 5.6 | 104 |
| J | 6.5 | 6.3 | 103 |

EXAMPLE 3

In a magnesium-strontium-stannum phosphate phosphor, when 8 mol percent of strontium carbonate to be added as a strontium constituent is substituted with strontium bromide and then the substituted substance is calcined for three hours in a stream of nitrogen gas at a temperature of 1120° C., the phosphor thus obtained possesses a powder brightness which is approximately 4% brighter than that of a like phosphor not subjected to substitution with bromide.

EXAMPLE 4

During synthesis of a calcium-stannum phosphate phosphor, 10 mol percent of calcium carbonate to be added as a calcium constituent is substituted with calcium bromide. When a mixture as shown in the following Table 3 is prepared, mixed and calcined for two hours in air in an electric furnace at a temperature of 1050° C., calcium ortho-phosphate is obtained as a result of the undermentioned chemical reactions.

$$2CaHPO_4 + 0.9CaCO_3 + 0.1CaBr_2 \rightarrow Ca_3(PO_4)_2 + H_2O\uparrow + 0.9CO_2\uparrow + 0.1Br_2\uparrow$$

*Table 3*

| Material | | Mol percent | Weight (grams) |
| --- | --- | --- | --- |
| Secondary calcium phosphate (calcium phosphate, dibasic). | $CaHPO_4$ | 2.0 | 272.1 |
| Calcium Carbonate | $CaCO_3$ | 0.9 | 90.0 |
| Calcium Bromide | $CaBr_2$ | 0.1 | 19.9 |

Then, SnO is added to this substance and calcination is further carried out for three hours in a stream of nitrogen gas at a temperature of 1100° C. to produce a phosphor.

By the above-described method, an ortho-phosphate phosphor of $Ca_3(PO_4)_2$:SnO which is the same as that in the case wherein substitution with $CaBr_2$ is not carried out is obtained and its powder brightness is 4% brighter than that of the phosphor produced without substitution with calcium bromide.

EXAMPLE 5

In a calcium silicate phosphor, 6 mol percent of calcium carbonate to be added as a calcium constituent is substituted with calcium bromide and mixed with other compounds as indicated in the following Table 4.

*Table 4*

| Material | | Weight (Grams) |
| --- | --- | --- |
| Silicate anhydride | $SiO_2$ | 120.2 |
| Calcium carbonate | $CaCO_3$ | 103.0 |
| Manganese carbonate | $MnO_2$ | 16.1 |
| Lead nitrate | $Pb(NO_3)_2$ | 10.0 |
| Calcium bromide | $CaBr_2$ | 14.0 |

The compounds of Table 4 are mixed and then tentatively calcined for two hours in air at a temperature of 1000° C., after which the mixture is further subjected to final calcination for three hours at 1200° C., whereby a phosphor which is 4% brighter than an equivalent substance produced by a process wherein calcium-bromide-substitution is not utilizied is obtained.

EXAMPLE 6

In a calcium tungstate phosphor, 6 mol percent of calcium carbonate is substituted with calcium bromide and mixed with other compounds as indicated in the following Table 5.

*Table 5*

| Material | | Weight (Grams) |
| --- | --- | --- |
| Ammonium para-tungstate, $5(NH_4)_2O \cdot 12WO_3 \cdot 11H_2O$ | | 300.0 |
| Calcium carbonate | $CaCO_3$ | 108.0 |
| Calcium bromide | $CaBr_2$ | 14.0 |

The compounds of Table 5 are mixed and then tentatively calcined for two hours in air at a temperature of 700° C., after which said mixture is subjected to final calcination for two hours at 1000° C., whereby a phosphor which is 3% brighter than an equivalent substance produced by a process wherein calcium-bromide-substitution is not utilized is obtained.

As described in the foregoing, the present invention provides a process wherein, in the production of a phosphor of oxy-salt group, one portion or the whole of one compound or a mixture of two or more compounds selected from a group of salts such as the carbonate of an alkaline earth metal, or the oxide thereof, which are to be added as a constituent material, is substituted by a bromide, and wherein the function of the bromide, which, by being dissolved and decomposed in the course of calcination, promotes the reaction of synthesis of the phosphor, is utilized. Accordingly, it is possible to elevate the calcining temperature to the optimum temperature for the phosphor, whereby the brightness of the phosphor obtained is increased, and, moreover, a stable phosphor is obtainable. Particularly, in the production of halophosphate phosphor, variations in the phosphor compositions after calcination can be perfectly prevented and its brightness can be increased by this method.

Furthermore, by using a bromide in the calcination of the phosphor, the bromide is dissolved and decomposed during the calcination of the phosphor and bromine is evaporated off. Accordingly, even if calcination is carried out at a high temperature, the phosphor after calcination will not coagulate, but will be easily pulverized.

The method of the present invention has numerous other advantages. For example, when a phosphor produced by the method of this invention is used in an electric discharge lamp, the luminous flux is increased, and the luminous flux maintenance factor is also improved, whereby an electric discharge lamp of high efficiency can be obtained.

While the invention has been described with reference to particular examples of method, it will, of course, be understood that the invention is not intended to be limited thereto, since many modifications may be made, and it is, therefore, contemplated by the appended claims to cover all such modifications as fall within the true spirit and scope of the invention.

What is claimed is:

1. In a method of synthesizing a halophosphate phosphor by calcining a mixture which includes at least one alkaline earth metal compound selected from the group which consists of oxides and salts which are converted to oxides during calcination, the steps which comprise substituting in said mixture before calcining about 2 mol percent to about 10 mol percent of an alkaline earth metal bromide for about 2 mol percent to about 10 mol percent respectively, of said alkaline earth metal compound based on the total quantity of said alkaline earth metal compound required in said mixture for the synthesis of said phosphor, and calcining the resultant mixture at a temperature above the melting point of said bromide, whereby said bromide is decomposed and converted into an alkaline earth metal oxide.

2. A process as defined in claim 1 wherein said resultant mixture is calcined at a temperature of the order of 1100° C. to 1200° C.

3. A process as defined in claim 1 wherein about 6 mol percent to about 8 mol percent of an alkaline earth metal bromide is substituted for about 6 mol percent to about 8 mol percent respectively of said alkaline earth metal compound based on the total quantity of said alkaline earth metal compound required in said mixture to prepare said phosphor.

4. A method as defined in claim 1 wherein said alkaline earth metal compound is a carbonate.

5. In a method of synthesizing a halophosphate phosphor by calcining a mixture which includes at least one alkaline earth metal compound selected from the group which consists of oxides and salts selected from the group consisting of nitrates and carbonates which are converted to oxides during calcination, the steps which comprise substituting in said mixture before calcining about 2 mol percent to about 10 mol percent of an alkaline earth metal bromide, for about 2 mol percent to about 10 mol percent respectively, of said alkaline earth metal compound based on the total quantity of said alkaline earth metal compound required in said mixture for the synethsis of said phosphor, and calcining the resultant mixture at a temperature of the order of 1100° C. to 1200° C. whereby said bromide is decomposed and converted into an alkaline earth metal oxide.

References Cited by the Examiner
UNITED STATES PATENTS

| | | | |
|---|---|---|---|
| 2,697,076 | 12/1954 | Anderson et al. | 252—301.4 |
| 3,014,877 | 12/1961 | Ranby et al. | 252—301.4 |
| 3,111,493 | 11/1963 | Ropp | 252—301.4 |

TOBIAS E. LEVOW, *Primary Examiner.*

MAURICE A. BRINDISI. *Examiner.*